Jan. 26, 1965    R. R. KEY    3,167,167
DOUGH-TWISTING APPARATUS
Original Filed Jan. 3, 1961    8 Sheets-Sheet 6

INVENTOR.
BY Roy R. Key
ATTORNEYS.

Jan. 26, 1965 R. R. KEY 3,167,167
DOUGH-TWISTING APPARATUS
Original Filed Jan. 3, 1961 8 Sheets-Sheet 7

INVENTOR.
BY Roy R. Key.

ATTORNEYS.

INVENTOR.
Roy R. Key.
BY Wood, Herron & Evans.
ATTORNEYS.

United States Patent Office 3,167,167
Patented Jan. 26, 1965

3,167,167
DOUGH-TWISTING APPARATUS
Roy R. Key, 755 Mayberry St., Hemet, Calif.
Original application Jan. 3, 1961, Ser. No. 80,487, now Patent No. 3,027,852, dated Apr. 3, 1962. Divided and this application Dec. 6, 1961, Ser. No. 157,598
8 Claims. (Cl. 198—26)

The present invention relates generally to the bakery art and more particularly to novel apparatus for twisting two dough pieces together prior to baking. The present application is a divisional application of the copending application of Roy R. Key for "Dough-Twisting Machine," Serial No. 80,487, filed January 3, 1961, now Patent No. 3,027,852, granted April 3, 1962. Application Serial No. 80,487 is in turn a continuation-in-part of the application of Roy R. Key for "Dough-Twisting Machine," Serial No. 847,016, filed October 16, 1959 (now abandoned).

It has been known for some time that bread which is made from lengths of rolled dough which have been twisted together prior to baking has many advantages over conventional bread, including finer texture and improved keeping qualities. However, one decided disadvantage of the twisted bread is that it is more expensive to produce than conventional bread because of the extra labor involved in manually twisting the bread by hand prior to positioning it in the baking pans.

In accordance with the present invention, two elongated dough pieces are deposited in side-by-side relationship upon an arcuately moving carrier, the dough pieces being disposed substantially radially relative to the center of rotation of the carrier. These dough pieces are carried beneath a flexible blanket member of substantial weight and having a substantial extent in the direction of dough travel. The flexible blanket member engages the leading edge of the pair of dough pieces to apply a retarding pressure to the advancement of the dough pieces and at the same time the flexible blanket applies an appreciable downward pressure on the dough pieces. The combination of these two pressures causes the forward dough piece to be retarded and the outer end of the piece lifted while the radially outer end of the rearward dough piece is carried beneath the forward dough piece. Thus, a twisting action is initiated at the faster moving, radially outer ends of the dough pieces. Then, as the lowermost dough piece becomes advanced beyond the upper dough piece, the blanket engages and retards the outermost end of the lower dough piece so that this end is lifted and the end of the dough piece previously on top is twisted around beneath it. This action continues until both pieces of dough are tightly twisted together throughout their lengths. At the same time that the dough pieces are being twisted, however, the dough pieces undergo an appreciable elongation; for example, an elongation of two inches in fourteen. Also, each of the dough pieces is helically coiled about its own longitudinal axis.

It has been empirically determined that dough pieces twisted in this manner produce bread of finer texture than bread produced by either conventional straight-away or cross grain molding or by manual twisting. The improved texture is due at least in part to the fact that the dough pieces twisted in accordance with the present invention are not only twisted about one another as in a conventional manually twisted loaf, but additionally each of the individual dough pieces is twisted about its own axis.

One important object of the present invention is to provide a novel machine for automatically twisting bread in accordance with the present method. The said novel dough twisting machine is effective to receive elongated pieces of dough, for example, coiled strips of dough as they are discharged from beneath a conventional curling chain, in random spacing and to group these elongated strips of dough in pairs. The present machine is further effective to automatically twist each pair of dough pieces together while at the same time twisting each of the individual pieces about its own axis and effecting an elongation of the pieces. The present machine then applies a setting pressure to the twisted dough pieces to prevent their subsequent untwisting. Finally the machine deposits the twisted and set dough pieces into a baking pan.

The present machine for twisting dough is not only instrumental in producing bread of improved quality but also is highly advantageous since it is effective to automatically twist dough pieces at a high production rate, for example 40 to 60 loaves per minute. Moreover, each of the loaves twisted utilizing the present apparatus is substantially uniform irrespective of the rate at which the loaves are twisted.

The present twisting machine includes a novel accumulating and feeding mechanism which receives pieces of dough in random spaced-apart relationship and which automatically and continuously groups them in pairs and discharges them onto a belt of the twisting mechanism in a side-by-side relationship. This accumulating mechanism is automatically actuated by the pieces of dough fed to it, and is effective to quickly and continuously group the pieces in pairs and deposit them onto the belt of the twisting machine in a predetermined position, as quickly as they enter the mechanism.

In essence, the present accumulator comprises a chute or other trough-like member adapted to hold two horizontally disposed dough pieces, the dough pieces being disposed one above the other. The trough includes a bottom member having associated therewith power operated means for rapidly shifting the bottom member to a position in which the dough pieces drop downwardly from the trough. The control for this operator includes a main actuating switch in circuit controlling connection with the operator together with means for conditioning this switch when a first dough piece enters the trough so that as a second dough piece enters the trough the switch is closed to energize the operator and open the trough bottom whereby the pair of dough pieces is discharged in side-by-side relationship onto a twisting belt.

The present machine further comprises a twisting mechanism which receives the elongated pieces of dough in paired side-by-side relationship from the accumulator and automatically and continuously twists them together, while at the same time helically twisting each piece.

The twisting mechanism includes a suitable platform such as a semi-circular belt moving on an arcuate path in a substantially horizontal plane and containing a feed station and discharge station. At the feed station, dough pieces are deposited by the accumulator onto the belt in a side-by-side relationship so as to extend substantially radially of the movement of the belt, the dough pieces having inner and outer ends. A relatively heavy stationary blanket-like member, overlies the belt between the feed station and the discharge station, the leading edge of the blanket-like member being elevated so that the rolls of dough can pass between it and the belt.

The blanket member is flexible, is of substantial weight, and has an extent parallel to the direction of movement of the belt. This blanket member thus generally conforms to the shape of the dough pieces passing beneath it, i.e., it droops in front of and behind the dough pieces and is thus effective to apply both a retarding force on the leading portions of the dough pieces and a downward pressure force on the top surface of the dough pieces. In the preferred embodiment, this blanket member is not only flexible in the direction of the line of movement of the dough pieces, but is also flexible in a direction transverse to their line of movement, i.e., flexible on a radial line. Thus, the preferred form of belt is not only effective to droop in front of and behind the dough pieces, but also is effective to droop at the sides; and consequently is effective to provide maximum surface contact with the dough pieces.

One of the most important advantages of the present flexible blanket member is that it engages each pair of dough pieces in exactly the same manner and over a maximum area of the dough piece so that each pair of dough pieces is twisted in exactly the same manner whether the machine is producing at a low rate so that only one pair of dough pieces underlies the blanket at a time or whether the machine is producing at a high rate so that perhaps four pairs of dough pieces underlie the blanket simultaneously.

In detail, a preferred form of blanket is formed of metal chain links. One group of these chain links is connected to form a plurality of concentric arcuate rows extending parallel to the direction of dough movement. Other links interconnect these rows also generally radial lines. These links have substantially universal freedom of movement relative to one another so that maximum flexibility is provided. Because the blanket-like member engages the upper surfaces and leading portions of the rolls and therefore retards the movement thereof, and because the outer ends of the rolls normally move at a faster rate than the inner ends, the outer ends are retarded at a faster rate than the inner ends so as to cause a twisting together of the rolls.

The present twister mechanism is effective to apply a much tighter twist to the dough pieces than is applied during manual operation. The present invention further contemplates the provision of a setting mechanism for receiving the twisted dough pieces and applying a continuous pressure to these dough pieces for an appreciable length of time, e.g., three to four seconds. This pressure is effective to set the two twisted dough pieces together to prevent their subsequent untwisting in the baking pan. In the present apparatus, this setting mechanism comprises two belts having parallel runs spaced apart a lesser distance than the cross sectional dimension of the twisted dough pieces. After the twisting, the dough pieces are passed between these parallel belt runs which are advanced at a speed so that the belts apply setting pressure to the twisted dough pieces for several seconds.

The final component of the present apparatus is a panning mechanism which receives the twisted dough pieces from the pressure belts and deposits them into pans carried beneath the panning mechanism on a suitable conveyor. As will readily be appreciated by those skilled in the art, the panning of twisted dough pieces presents unique problems not present in the panning of conventional bread. Thus, it is not only necessary in panning twisted bread to deposit the dough pieces accurately in the pans, but it is also necessary to drop the dough pieces into the pans without untwisting the dough. The present panner accomplishes this by depositing the dough pieces on a reciprocating carriage member having two flaps. As the carriage member is shifted in the direction of dough travel at the same speed as the setting belts, the dough pieces are dropped from the setting belts onto the flaps. These flaps are then shifted rapidly linearly in opposite directions to drop the dough into a pan held beneath the flaps. The dough pieces drop downwardly into the pan without any tendency to untwist.

These and other objects, features and advantages will be more readily apparent from a consideration of the following detailed description of the drawings illustrating a preferred embodiment of the invention.

Figure 1:
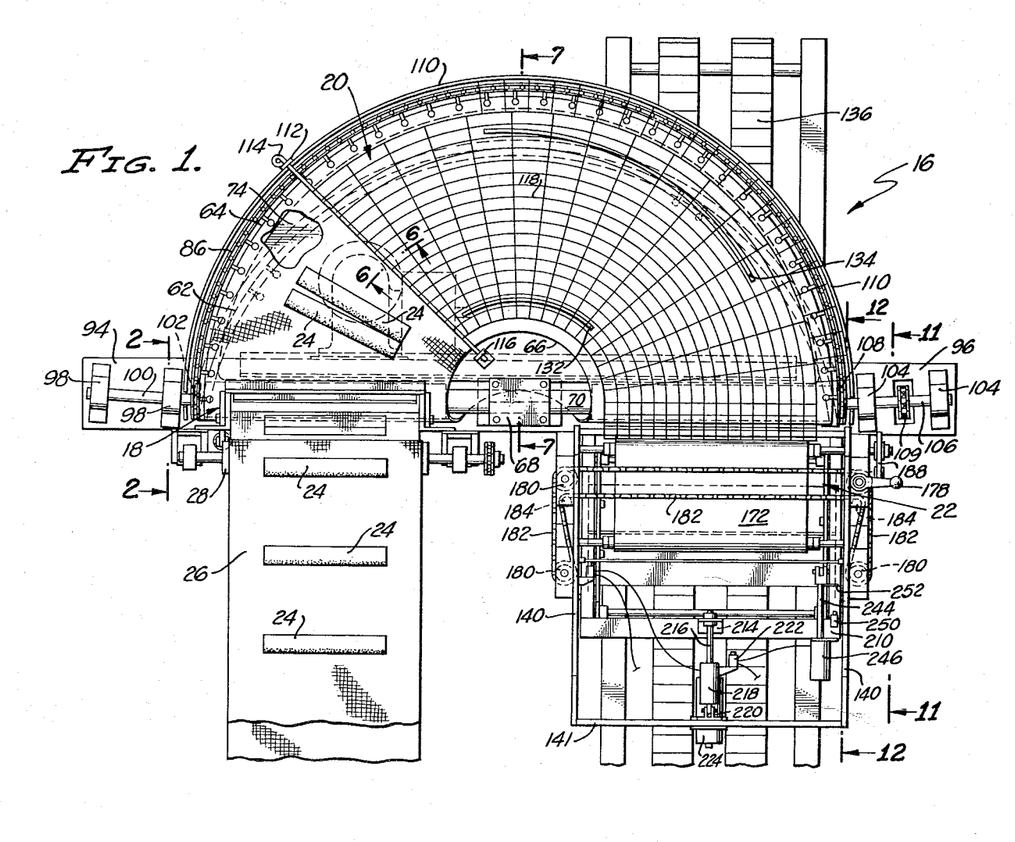
FIGURE 1 is a top plan view of a dough-twisting machine constructed in accordance with the teachings of the present invention.

The general construction of one preferred form of dough-twisting machine 16 embodying the teachings of the present invention is best shown in FIGURE 1. The device includes a roll-accumulating and feeding mechanism 18 which receives rolls of dough in spaced relationship and accumulates them in pairs and feeds them to a twisting mechanism 20 in side-by-side relationship, and a roll-receiving and dispensing mechanism 22 which receives the twisted rolls and deposits them in baking pans which are then conveyed to the proof box.

Figure 2:
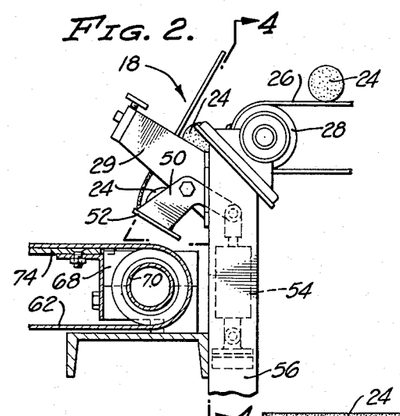
FIGURE 2 is an enlarged vertical sectional view taken on the line 2—2 of FIGURE 1 showing the roll-accumulating and feeding mechanism in elevation.
Figure 3:
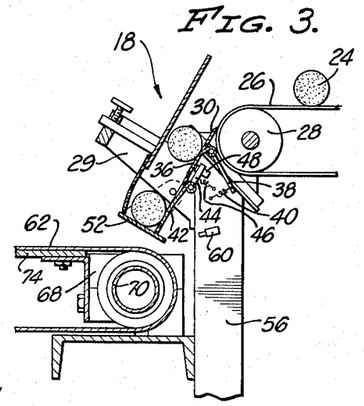
FIGURE 3 is a view similar to FIGURE 2 (taken on the line 3—3 of FIGURE 4) showing the roll-accumulating and feeding mechanism in cross section.
Figure 4:
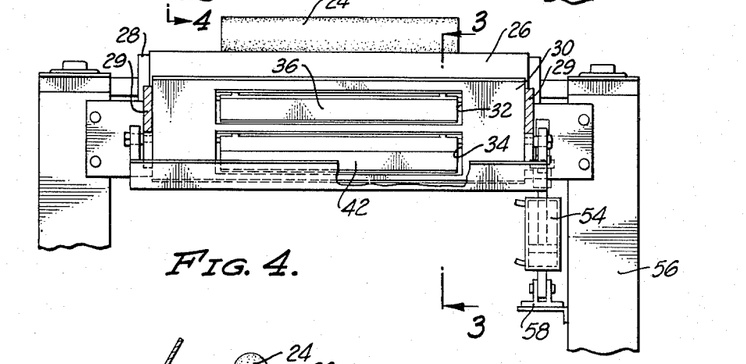
FIGURE 4 is a vertical sectional view of the front of the roll-accumulating and feeding mechanism taken on the line 4—4 of FIGURE 2.
Figure 5:
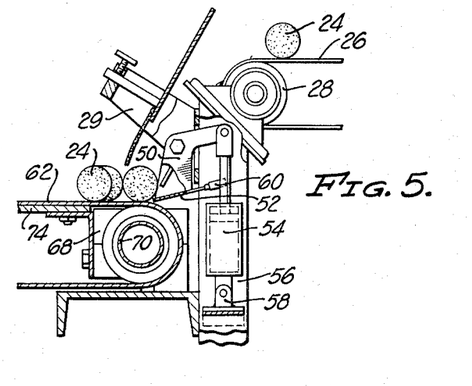
FIGURE 5 is a vertical sectional view similar to FIGURE 3 but showing the paired rolls of dough being fed to the twisting mechanism.

As shown in FIGURE 1, rolls 24 of dough which have previously been sheeted and curled in any suitable manner are deposited in irregular spaced relationship on an endless conveyor 26 (by means not shown) which moves them to the roll-accumulating and feeding mechanism 18, the conveyor 26 passing around a roller 28 (FIGURES 2 and 3) immediately adjacent said mechanism. The roll-accumulating and feeding mechanism 18 includes spaced arms 29 for supporting a rear apron 30 which contains upper and lower elongated horizontal openings 32 and 34, respectively (FIGURE 4), the upper edge of the apron being adjacent the roller 28. Pivotally mounted in the upper opening 32 is an upper trigger plate 36 (FIGURE 3) which contains a lever arm 38 which is restrained by a spring 40. A similar pivotally mounted lower trigger plate 42 is positioned in the lower opening 34, said lower trigger plate including an arm 44 which is restrained by a spring 46 and which carries a first switch member 48. Pivotally mounted on the arms 29 are actuating members 50 (FIGURE 2) which carry a trough plate 52, the members 50 being actuated by a hydraulic cylinder 54 having one end thereof pivotally connected to an upright support 56 through a bracket 58. As shown in FIGURES 3 and 5, a second switch member 60 is mounted on the support 56 and is contacted by the trough plate 52 when the latter and the actuating members 50 are moved to a feeding position (FIGURE 5).

Figure 20:
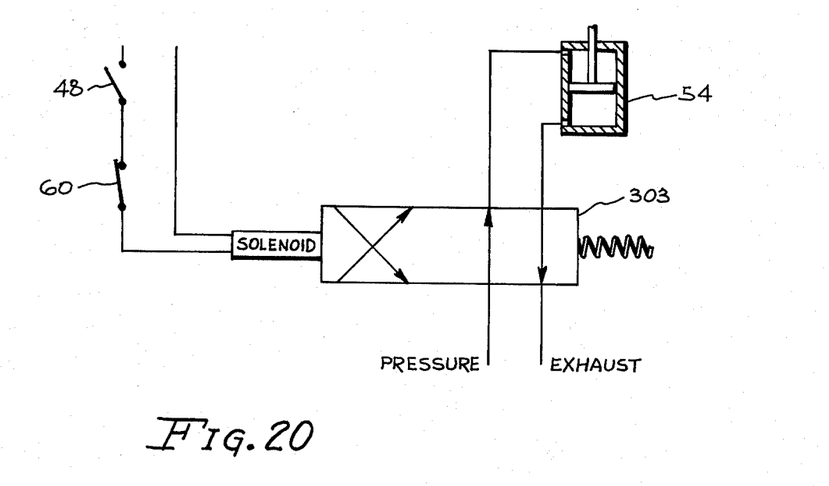
FIGURE 20 is a diagrammatic view showing the electrical and hydraulic connections for the roll accumulating and feeding mechanism disclosed in FIGURES 2–5.

As is shown diagrammatically in FIGURE 20, in accordance with one well known electro-hydraulic circuit, cylinder 54 includes a double acting piston, the cylinder being provided with ports adjacent either end of the cylinder. These ports are connected to pressure and exhaust sources through a solenoid operated valve 303. The electrical solenoid of this valve is adapted to be energized through series connected switches 48 and 60. When the switches are open, the cylinder 57 is connected to pressure and exhaust as shown in FIGURE 20 so that the piston is urged to its lowermost position. However, when both the switches are closed and the solenoid is energized, valve 303 is shifted to connect the pressure source beneath the piston in cylinder 54 to raise the piston and shift the trough plate to its "open" position.

In the receiving position (FIGURES 2 and 3), the position of the piston of hydraulic cylinder 54 is such that the trough plate 52 is at right angles to the apron 30 so as to receive and support rolls of dough 24 which are discharged from the end of the conveyor 26. When the first roll of dough 24 rolls down the apron 30 and contacts the trough plate 52, the roll bears against the lower trigger plate 42 and causes the arm 44 and first switch member 48 to move against the action of the spring 46 so as to position the switch member 48 immediately adjacent the upper trigger plate 36. Consequently, when a second roll of dough rolls down the apron 30, it causes the upper trigger plate 36 to move against the action of the spring 40 and actuates the first switch member 48. This actuates the hydraulic cylinder 54 and causes it to pivot the actuating members 50 and the trough plate 52 to the feeding position shown in FIGURE 5 in which the pair of dough rolls is discharged onto the twisting mechanism in a side-by-side relationship. In this feeding or discharge position, the trough plate 52 engages and actuates the second switch 60 which then causes the hydraulic cylinder 54 to return the actuating members 50 and the trough plate 52 to the receiving position (FIGURES 2 and 3) in time to receive the first roll of the next pair of dough rolls.

Figures 6, 7, 8, 9, 10:
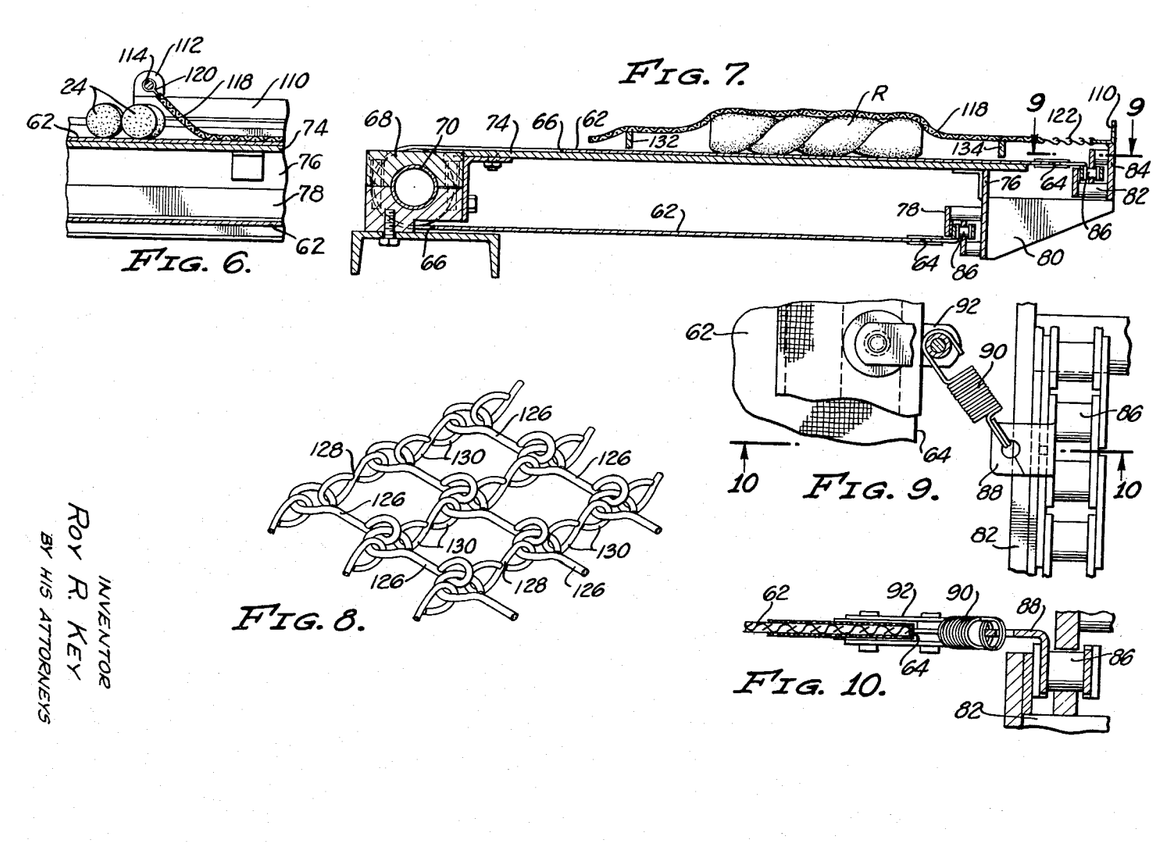
FIGURE 6 is an enlarged vertical sectional view taken on the line 6—6 of FIGURE 1 showing the paired dough rolls starting to pass under the blanket-like member.
FIGURE 7 is an enlarged vertical sectional view taken on the line 7—7 of FIGURE 1 showing the manner in which the blanket-like member drapes over the rolls of dough.
FIGURE 8 is an enlarged perspective view of a portion of the preferred blanket-like member.
FIGURE 9 is an enlarged fragmentary top plan view taken on the line 9—9 of FIGURE 7 showing the manner in which the fabric belt is connected to the driving chain.
FIGURE 10 is a vertical sectional view taken on the line 10—10 in FIGURE 9.

Turning to a consideration of the twisting mechanism 20, which is the heart of the device, it includes an annular belt 62 of fabric or like material which has an outer edge 64 and an inner edge 66 (FIGURE 7) and which is supported in a manner to provide an endless conveyor of semicircular configuration which moves in an arcuate path (FIGURE 1). A center post 68 (FIGURE 1) supports a tubular shaft 70 which extends transversely of the device between the feeding mechanism 18 and the dispensing mechanism 22 and which rotatably supports a plurality of individual rollers 72 (FIGURE 15) in side-by-side spaced relationship. As shown in FIGURES 1 and 7, the belt 62 rides around and is supported on the rollers 72. Supported adjacent the shaft 70 is a horizontally extending bed plate 74 of semicircular configuration which has the flat or inner edge thereof parallel to the shaft, and the outer edge supported on a curved plate member 76 (FIGURE 7). A lower chain guide channel 78 is supported on the inner surface of the curved plate member 76 and extending outwardly from the outer surface thereof are brackets 80 which support an upper chain guide channel 82, the latter including an outer plate member 84 for a purpose to appear. Positioned in the aforementioned chain guides is a continuous sprocket chain 86 which contains integrally formed spaced clips 88 (FIGURES 9 and 10) which support coiled springs 90 having the inner ends thereof connected to brackets 92. The brackets 92 comprise plates which are fastened to the belt 62 adjacent the outer edge 64.

As shown in FIGURE 1, a structural channel member extends transversely of the device beneath the shaft 70 and has opposed ends 94 and 96. Mounted on the upper surface of the end 94 are spaced journal members 98 which rotatably support a shaft 100 having an idler sprocket gear 102 mounted on the inner end thereof. Mounted on the upper surface of the end 96 are similar journal members 104 which rotatably support a drive shaft 106 having a driven sprocket gear 108 (FIGURES 11 and 12) mounted on the inner end thereof, the shaft 106 being driven through a chain 109 from a power source not shown. Thus, it will be readily apparent from the foregoing description that the belt 62 passes around the rollers 72 on the shaft 70 with the upper portion thereof sliding on the bed plate 74 and with the outer edge carried by the sprocket chain 86 traveling in the channels 78 and 82. One loop of the chain passes around the idler sprocket gear 102 and the other loop passes around the drive sprocket 108, whereby the sprocket chain 86 and the belt 62 are driven together and function as an endless conveyor.

As best shown in FIGURES 1 and 7, in one preferred embodiment the inner edge 66 and the outer edge 64 of the bottom portion of the belt 62 are displaced inwardly of the respective inner and outer edges of the upper portion of the belt which rests on the bed plate 74, i.e., when viewed on the line 7—7 in FIGURE 1. However, it will be noted that they are in vertical alignment as they pass over the rollers 72 on the shaft 70. In short, the upper portion of the belt is slightly greater than a half circle, and therefore the lower portion is less than a half circle because the transversely extending center line of the belt, so to speak, is on top and coincides with the center line of the shaft 70 instead of the side edge. The reason for this is as follows: As mentioned previously, two rolls 24 of dough in side-by-side relationship are discharged onto the upper surface of the belt 62 from the accumulating and feeding mechanism 18 (FIGURE 5). Thereafter, they are carried around on the upper portion of the moving belt 62. Inasmuch as it is advisable to maintain the rolls on a moving line which extends radially of the movement of the belt, it is necessary to feed the rolls onto the belt in a radial position, or actually at the aforementioned imaginary transversely extending center line of the belt. Consequently, the transversely extending center line of the belt 62 (which is the center line of the shaft 70) is spaced away from the curved inner edge of the belt which passes around the rollers 72 and is immediately under the discharge end of the accumulating and feeding mechanism 18. It will be understood, however, that in many embodiments it is not absolutely essential that the dough pieces be deposited accurately on a radius. In such installations the upper and lower belt runs can be vertically aligned and the dough pieces deposited from the accumulator slightly offset from a true radius.

As previously mentioned, the upper chain guide channel 82 (FIGURE 7) includes an outer plate member 84. Mounted on top of said plate member 84 is a curved angle member 110 (FIGURES 1, 6 and 7) which extends from the three-o'clock position adjacent the drive shaft 106 to about the ten-o'clock position. As shown in FIGURE 6, a clip 112 is mounted adjacent the one end of the angle member 110 and supports a rod 114 which extends inwardly above the upper surface of the belt 62 (FIGURE 1) and which has the inner end thereof supported on a bracket 116 mounted on the bed plate 74 adjacent the center post 68. One side of a flexible, relatively heavy, blanket member 118 (which is preferably made from chain links, as will be described more fully hereinafter) is fastened to the rod 114 by rings 120 and the outer peripheral edge of the blanket member 118 is fastened to the angle member 110 by means of hooks 122. The inner peripheral edge of the blanket member 118 is unsupported and the other side edge thereof is fastened to a rod 124 (FIGURE 12) which is positioned above the belt 62 and which is supported in the receiving and dispensing mechanism 22. The effective length of blanket 118 can be varied by means of a rod 290. This rod underlies the chain and is pivotally mounted at its inner end as at 291. The outer end of rod 290 carries a bracket 292 which rests upon and is adjustably clamped to angle member 110.

The blanket member 118 overlies and is supported on the upper surface of the belt 62 (FIGURE 6) and is preferably formed from interlocking circumferentially extending chain links 126 and radially extending chain links 128 (FIGURE 8), the latter including depending bight-like portions 130 for engaging the rolls 24 of dough. Thus, as the side-by-side rolls 24 are carried by the belt 62 under the rod 114 (FIGURE 6), the depending bight portions 130 of the blanket member 118 engage the upper surfaces and leading portions of the rolls. This causes a drag or retarding action on the leading roll and tends to hold it stationary while the following roll starts to pass beneath it. However, because the outer end of the following roll is at a greater distance than the inner end from the center of the moving belt 62, and therefore moves faster than the inner end, the outer end of the following roll will tend to move under the outer end of the retarded leading roll at a faster rate than the inner end of the following roll moves under the inner end of the retarded leading roll, whereby the rolls start to twist together. Each time the leading portion of one of the rolls comes in contact with the radially extending links 128, it is retarded and the following portion of a roll tends to pass under it. Because the outer ends of the rolls normally move faster than the inner ends thereof and the retarding means, i.e., the blanket member 118, is stationary, the outer ends of the rolls will be turned over faster than the inner ends thereof so as to cause the rolls to be twisted together. Obviously, the number of twists depend on the arcuate length of the blanket member 118, or, stated differently, the distance the rolls travel in contact with the blanket member. The bight portions 130 of the radially extending links are relatively smooth and therefore gently hold the leading portions of the rolls without tearing or adversely affecting the dough. Also, because the blanket member 118 overlies the entire rolls, there is no distortion or differential stretching of a portion of a roll.

Infrequently the twisted dough rolls have a tendency to creep outwardly of the belt 62. If this difficulty is encountered, it can be remedied by providing adjustable guide members to maintain the rolls in a predetermined radial position. Suitable guide means are shown in FIGURES 1 and 7 as inner 132 and outer 134 arcuate strips which are positioned above the belt 62 and which are adjustable both radially and circumferentially, the outer strip 134 being supported on the arcuate plate 84 and the inner strip 132 being supported on the bed plate 74 adjacent the center post 68. It is to be understood, however, that these guide members are not normally required and can be omitted from the machine if desired.

Figures 11, 15:
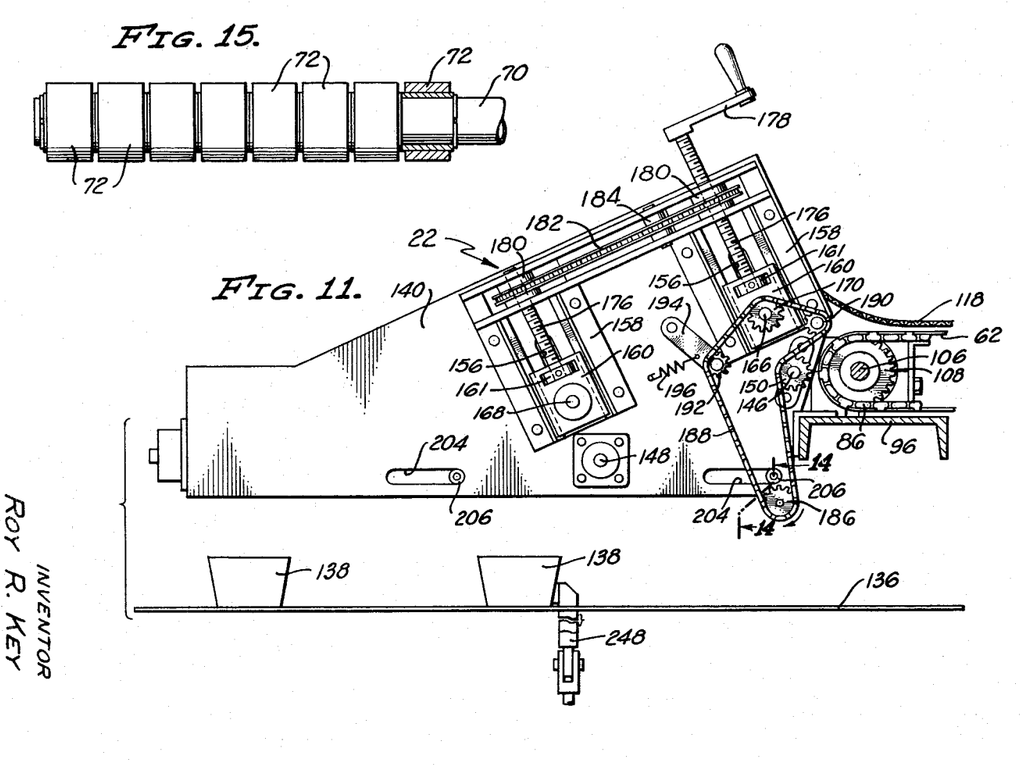
FIGURE 11 is an enlarged side elevational view taken on the line 11—11 in FIGURE 1 showing the roll-receiving and dispensing mechanism.
FIGURE 15 is an elevational view (partially in section) showing one of the roller assemblies which supports the dough-twisting belt.
Figures 12, 13, 14:
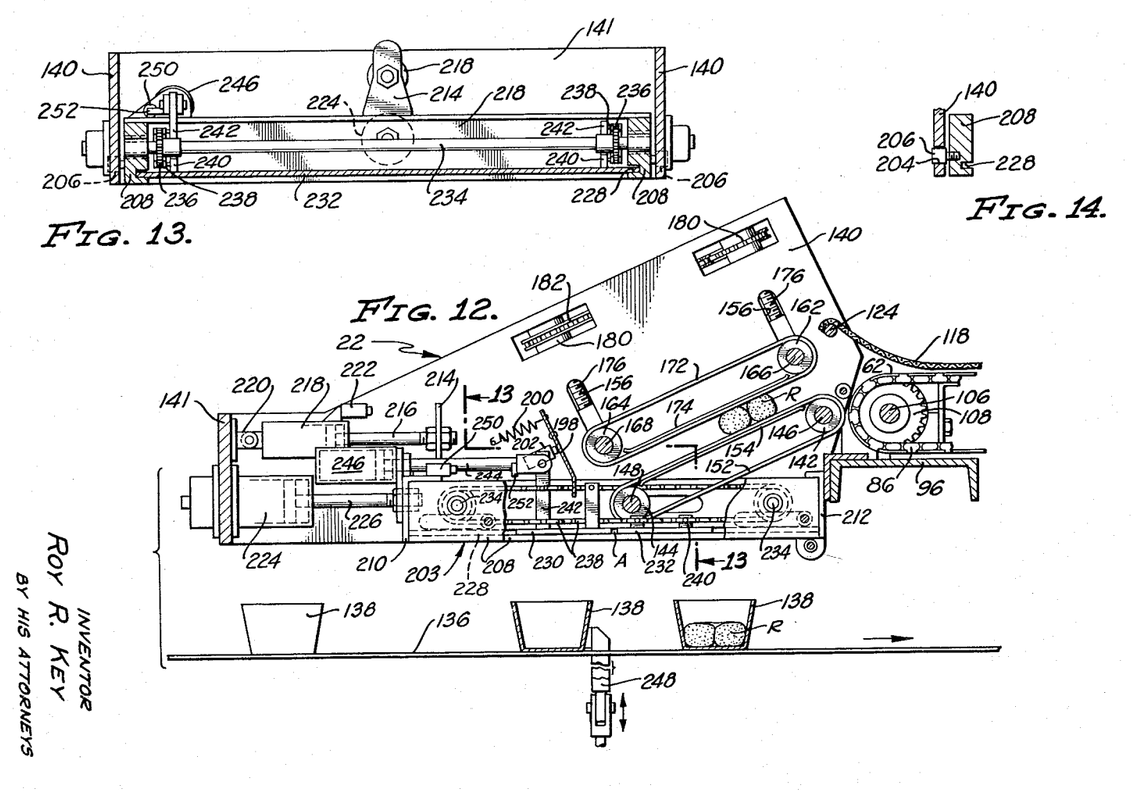
FIGURE 12 is an enlarged vertical sectional view taken on the line 12—12 in FIGURE 1 showing the internal construction of the roll-receiving and dispensing mechanism.
FIGURE 13 is an enlarged vertical sectional view taken on the line 13—13 in FIGURE 12.
FIGURE 14 is an enlarged vertical sectional view taken on the line 14—14 in FIGURE 11.

After the rolls 24 are twisted together (hereinafter identified by the letter R), they pass from under the trailing edge of the blanket member 118, and enter into the receiving and dispensing mechanism 22 (FIGURES 11 through 14) which "sets" the twist in the rolls and discharges them into pans which are then conveyed to the proof box. As shown in FIGURES 1 and 12, a continuous divided conveyor 136 passes beneath the aforementioned mechanism 22 and supported thereon in spaced relationship are baking pans 138.

The receiving and dispensing mechanism 22 contains two, outer, spaced-apart vertically extending plates 140 which are connected together at one end by an end wall 141 and which support the equipment which presses a "set" into the twisted rolls R immediately after they leave the belt 62. As shown in FIGURES 11 and 12, an inner lower roller 142 and an outer lower roller 144 are rotatably supported between the plates 140 on shafts 146 and 148, respectively, the inner lower shaft 146 containing a sprocket gear 150 at one end thereof externally of the respective outer plate 140. A lower belt 152 is mounted on the rollers 142 and 144 and passes over a lower backing plate 154 which extends transversely between the outer supporting plates 140. Two parallel slots 156 are provided in each of the outer plates 140, and mounted on the outer surfaces of the plates 140 adjacent each of the slots 156 is a guide assembly 158 which slidably supports a trunnion plate 160 containing a nut 161. An inner upper roller 162 and an outer upper roller 164 are rotatably supported on opposed trunnion plates 160 by means of shafts 166 and 168, respectively, the shaft 166 containing a sprocket gear 170 externally of the outer plate 140 (FIGURE 11). An upper belt 172 is mounted on the rollers 162 and 164 and passes under an upper backing plate 174. Also mounted on the outer surfaces of the outer plates 140 in association with each guide assembly 158 is an elongated screw member 176, one of which extends upwardly above the top of the outer plate 140 and which is provided with a handle member 178. The lower end of each screw member 176 is in engagement with a nut 161, and the upper end of each is provided with a sprocket gear 180. As shown in FIGURE 1, a sprocket chain 182 is wound around the four gears 180 and two idler gears 184 whereby, when the handle 178 is rotated, all of the gears 180 rotate in unison. Thus, when the gears 180 are rotated, the screws 176 rotate within the nuts 161 and raise and lower the trunnion plates 160, the upper rollers 162 and 164, and the upper belt 172. As shown in FIGURE 11, a drive sprocket gear 186 (driven by means not shown) is mounted on one of the outer plates 140, and drives a sprocket chain 188 which is in engagement with the gears 150 and 170 and two idler gears 190 and 192, the gear 192 being carried by a pivotally mounted arm 194 which tensions the chain 188 through the action of a spring 196 connected to the arm 194. Consequently, it will be readily apparent that when the twisted rolls R pass from under the blanket member 118 and off the inner end of the conveyor belt 62 (FIGURE 12), they pass downwardly between the moving upper and lower belts 172 and 152, respectively, which sets the twists in the rolls because the space between the belts is less than the thickness of the rolls. If the thickness or diameter of the dough rolls is changed, the distance between the upper and lower belts can be easily and quickly adjusted accordingly by merely rotating the handle member 178 as previously described.

When the twisted rolls R leave the lower ends of the moving belts 172 and 152, they engage a pivotally mounted switch plate 198 which is restrained by a spring 200. When moved by the rolls R, the switch plate closes a first switch 202 which causes the movement of a carriage identified generally by the numeral 203, and which results in the twisted rolls R being deposited in the baking pans 138.

As shown in FIGURES 11 and 14, each outer plate 140 is provided with two aligned horizontal slots 204 adjacent the lower edge thereof. Rollers 206 are positioned in the slots 204 so as to support the carriage 203 which includes spaced-apart inner plates 208 (FIGURE 13) which are fastened together by means of transversely extending end plates 210 and 212 of inverted L-shape (FIGURE 12). A bracket 214 extends upwardly from the upper surface of the end plate 210 and is connected to the shaft 216 of a hydraulic actuating cylinder 218 which is pivotally mounted on the end wall 141 by means of a bracket 220. A second switch 222 is mounted on the hydraulic actuating cylinder 218. Also mounted on the end wall 141 is a hydraulic check cylinder 224 which includes a shaft 226 fastened to the end plate 210. Thus, when the plate 198 closes the first switch 202, the hydraulic actuating cylinder 218 causes the carriage 203 to move in the leftward direction at the same speed as the set belts 152 and 172 (against the action of the check cylinder 224) until the upper portion of the bracket 214 engages and closes the second switch 222. This causes the movement of other components of the carriage 203, which will now be described.

As shown in FIGURES 13 and 14, the inner plates 208 of the carriage 203 are provided with opposed grooves 228 adjacent the bottom edge thereof. Slidably positioned in these grooves are doors 230 and 232 which extend transversely of the carriage and which are shown in the substantially abutting or closed position in FIGURE 12. Also extending transversely of the carriage adjacent each end thereof are shafts 234 which are rotatably mounted in the inner plates 208 and which have sprocket gears 236 adjacent each end thereof inwardly of said inner plates 208. A sprocket chain 238 extends around each pair of gears 236 on each side of the carriage so that both shafts 234 and both chains 238 move together. Mounted on the door 232 on each side thereof are upwardly extending arms 240 (FIGURES 12 and 13) which are fastened to the lower portion of each chain 238. Arms 242 are mounted on the door 230 in like manner and are connected to the upper portions of the sprocket chains 238, one of said arms on one side extending above the chain and being connected to the shaft 244 of a hydraulic actuating cylinder 246 which is mounted on the end plate 210. Thus, when the second switch 222 is closed, the hydraulic actuating cylinder 246 moves the shaft 244 leftwardly, causing the tops of the chains 238 to move to the left and the bottoms of the chains to move to the right. Because the door 230 is connected to the upper portions of the chains and the door 232 is connected to the lower portions thereof, the movement of the shaft 244 to the left causes the doors to move to a spaced-apart or open position.

Considering the complete dispensing operation from the time when the twisted rolls R leave the belt 62 and the blanket member 118, they first pass downwardly between the opposed belts 152 and 172 which sets the twist in the rolls as previously described. When the leading portion of the twisted rolls R causes movement of the switch plate 198, the latter closes the first switch 202 which causes the hydraulic actuating cylinder 218 to move the carriage 203 to the left at a speed which coincides with the speed of the set belts 152 and 172.

Thus, the doors 230 and 232 which are normally in the closed position are moved together under the twisted rolls R as the latter leaves the belts, whereby the rolls R fall in a flattened condition across a gap A between the two doors. When the upper portion of the bracket 214 engages and closes the second switch 222, the hydraulic actuating cylinder 246 causes a sudden movement of the chains 238 relative to the carriage 203, whereby the doors 230 and 232 jerk apart and drop the twisted rolls R downwardly into a pan 138 maintained in a predetermined position on the moving conveyor 136 by means which will now be described.

As shown in FIGURE 12, a retractable arm 248 extends upwardly between the two parallel portions of the divided conveyor 136 so as to engage and restrain a pan 138 in position under the doors 230 and 232 at the point where they jerk apart. The arm 248 is actuated by a hydraulic cylinder (not shown) which is controlled by a third switch 250 mounted on the upper portion of the end plate 210, which is alternatively opened and closed by a contact plate 252 fastened to the shaft 244. Consequently, in the normal or inoperative position, the switch 250 is open and the arm 248 is in the extended position. However, when the doors 230 and 232 are jerked apart to discharge the rolls R, the same movement closes the third switch 250 so as to cause the arm 248 to retract and permit the pan containing the rolls R to move to the proof room.

Thus, it is apparent that there has been provided a novel dough-twisting machine which fulfills all of the objects and advantages sought therefor. Rolls of dough which are deposited on a conveyor in spaced-apart positions at one end of the device are automatically and continuously brought together in pairs, twisted together, the twists set in the rolls, and the twisted rolls discharged from the other end of the device into baking pans ready for the proof box.

The accumulating and feeding mechanism receives the previously formed rolls and brings them together in pairs and deposits them on the belts of the twisting mechanism in side-by-side relationship, as fast as they enter the device. The twisting mechanism 20 automatically twists together the rolls of dough without any hand labor whatsoever, and the receiving and dispensing mechanism 22 sets the twists in the rolls and quickly and accurately deposits them in baking pans which pass on a conveyor under the discharge end of the device.

From the above disclosure of the general principles of the present invention and the above detailed description of one preferred embodiment, those skilled in the art will readily appreciate that many different modifications can be made in the apparatus without departing from the scope of the present invention.

Figure 16:
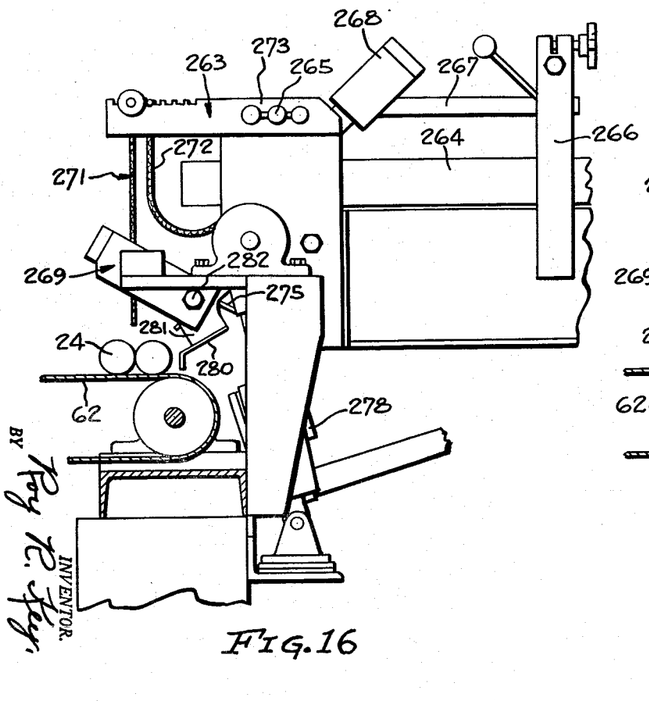
FIGURE 16 is a view similar to FIGURE 2 showing a modified roll-accumulating and feeding mechanism.
Figure 17:
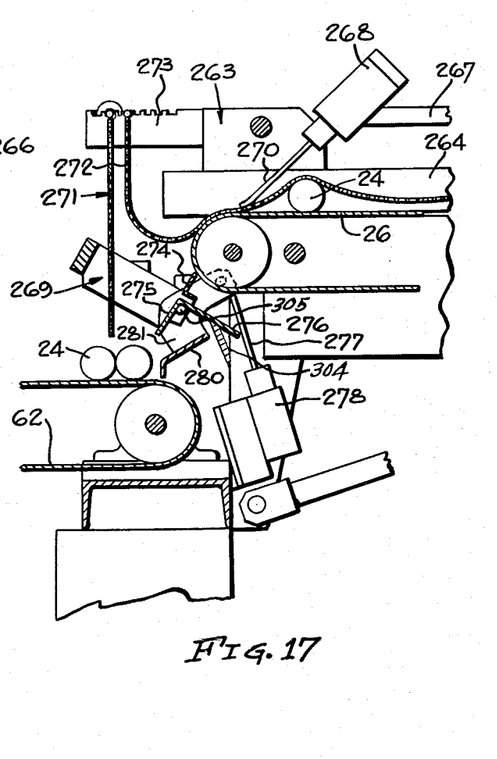
FIGURE 17 is a partly sectional view similar to FIGURE 3 of the modified roll accumulating and feeding mechanism of FIGURE 16.
Figure 19:
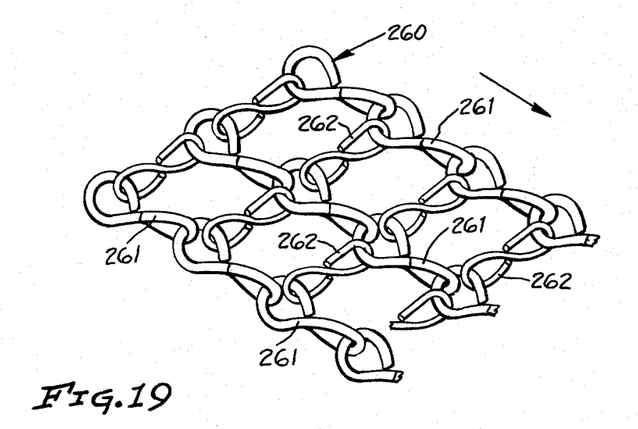
FIGURE 19 is an enlarged perspective view of a modified form of blanket chain.

By way of example, two such modifications are shown in FIGURES 16 and 17 and FIGURE 19. FIGURE 19 discloses a highly satisfactory form of blanket chain 260. This chain is adapted to be used in the same way as chain 118 shown in FIGURE 8. Chain 260 comprises a plurality of generally radially arranged spaced rows of jack chain 261. That is, when the chain is positioned over the twisting belt, these rows of chain extend radially outwardly from the center of rotation of the belt. Links 261 are joined together in a conventional manner so that the links are freely pivotal relative to one another and the chain is bendable in a transverse radial direction. Each link of jack chain 261 is joined to the corresponding links in adjacent rows by means of S hooks 262. These S hooks thus form a plurality of arcuate rows of hooks, each row being generally concentric with the pivotal axis of the twisting belt. The direction of dough movement relative to the section of chain shown in FIGURE 19 is indicated by an arrow.

Chain 260 is preferably of substantial weight, for example, in one highly satisfactory embodiment each of the links 261 weighs 5 grams, while each of the S hooks weighs 2.56 grams. The total chain used in the machine comprises 741 links of jack chain and 750 S hooks. Thus, the total weight of this chain is approximately twelve and one-half pounds. It will readily be appreciated that in working stiffer doughs it is at times desirable to employ an even heavier gage chain of greater weight.

A second modified component of the present apparatus is shown in FIGURES 16 and 17. These figures illustrate a modified form of accumulator indicated generally at 263. This accumulator is adapted to be used in place of the accumulator shown in FIGURES 2–5. Accumulator 263 receives irregularly spaced elongated dough pieces 24 from a delivery belt 26. The function of the accumulator is to group these pieces of dough in pairs and to deposit them in side-by-side relationship upon twister belt 62. The modified form of accumulator 263 comprises side guide members 264 disposed to overlie belt 26. These side guide members are adjustable in and out relative to belt 26 in a conventional manner by means of a transverse screw (not shown) rotatable by hand wheel 265 and in threaded engagement with the side guide members. Brackets 266 carry wheel 301 and in addition carry arm 267 upon which is mounted a suitable switch, such as micro-switch 268. Switch 268 is provided with an elongated switch finger 270 which depends downwardly at an angle toward the upper run of belt 26. This switch arm is positioned so that it is shifted to close switch 268 every time a dough piece 24 passes beneath the arm.

Accumulator 263 further comprises a chute or trough-like structure, the forward wall of which is constituted by a depending portion 271 of a length of curling chain 272. Chain 272 is suspended from a bracket arm 273. As is best shown in FIGURE 17, the chain also extends over a portion of belt 26 it being understood that the leading edge of the chain (not shown) is held in an elevated position so that dough lumps 24 pass under the chain.

The opposite wall of the trough 269 comprises a rigid plate 274 and a pivotally mounted flap 275. Flap 275 is pivoted upon pins 305 which are mounted upon the flap extending outwardly therefrom. These pins are mounted in suitable bearings carried by plate 274. The flap is spring urged slightly in a clockwise direction in any suitable manner, such as by means of spring 304 or by means of a weight, and includes a rearwardly extending arm 276 disposed in engagement with a movable switch actuator finger 277 of a second switch 278. In this embodiment, switch 278 remains stationary, but the contacts of the switch are held closed by the engagement of flap 275 with actuator 277 whenever a dough piece is disposed within trough 269.

The lower wall of the trough is formed by a cross plate 280. This cross plate is carried between two spaced arms 281 which arms are pivotally mounted to the frame as at 282. Arms 281 are connected by operating means including a pneumatic or hydraulic cylinder which is effective to pivot the plate 280 in a counterclockwise direction to its position shown in FIGURES 16 and 17 in which the dough pieces are free to drop from the chute 269 onto twisting belt 62. The cylinder is connected to a pressure source through suitable electrically responsive valve means (not shown) in a manner well known in the art. These valve means are energized through a circuit including switches 268 and 278 connected in series.

Figure 21:
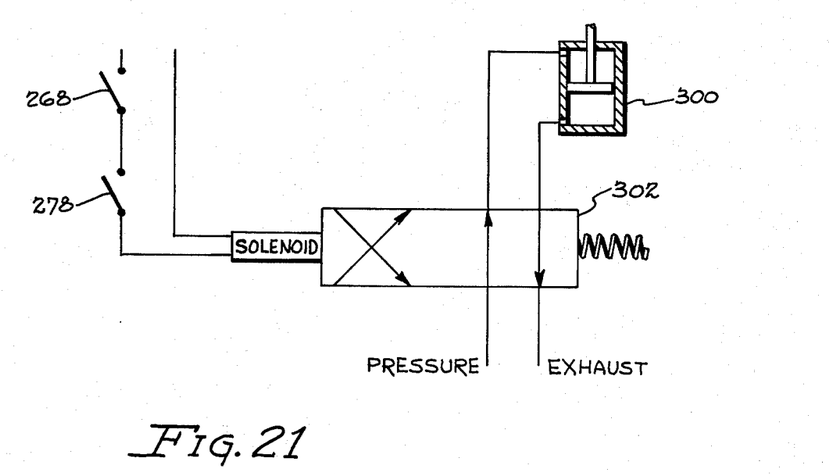
FIGURE 21 is a diagrammatic view of the electrical and hydraulic circuits of the roll feeding and accumulating mechanism shown in FIGURES 16 and 17.

The details of the electrical and hydraulic circuits are shown diagrammatically in FIGURE 21. As there shown, cylinder 300 houses a double acting piston. The cylinder is provided with ports adjacent to opposite ends of the cylinder. These ports are connected to pressure and exhaust lines through a solenoid operated valve 302. The solenoid valve 302 is connected to be energized through series connected switches 268 and 278. When either switch 268 or 278 is open, valve 302 connects the pressure source to the upper end of cylinder 300. Thus, the piston is lowered to hold bottom plate 280 in its closed position. However, when both switches 268 and 278 are closed, solenoid valve 302 is actuated to connect the pressure source to the port below the piston in cylinder 300. Thus, the piston is raised to shift plate 280 to its retracted or open position. When either switch 268 or 278 is open, plate 280 is returned to its normal position in which it is pivoted clockwise (upwardly) from its position shown in FIGURES 16 and 17 and extends across the space between the chain 271 and flap 275.

In the operation of the accumulator, the first dough piece delivered to the accumulator over belt 26 trips switch 268. However, this has no effect on the flap operator since switch 278, which is connected in series with switch 268, is held open. However, when the first dough piece drops over the end of belt 26 it rolls over plate 274 and engages flap 275 causing that flap to pivot in a counterclockwise direction to close switch 278. The dough piece is prevented from dropping onto belt 62 by bottom plate 280. The retraction of bottom plate 280 by means of its associated solenoid valve controlled cylinder and piston is prevented because switch 268 is now open. However, when a second dough piece passes under switch 268 and closes that switch a circuit is completed through switches 268 and 278 to an electrical control valve, or the like, causing actuation of a piston in the operating cylinder which rapidly pivots bottom plate 280 causing both pairs of lumps to drop onto twisting belt 62. The dough lumps drop onto this belt in side-by-side relationship and, as was explained previously, are positioned generally radially to the axis of rotation of belt 62.

Figure 18:
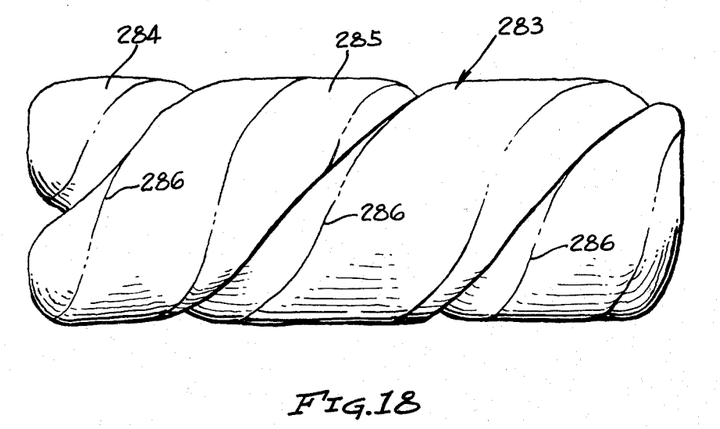
FIGURE 18 is a top plan view of a twisted loaf produced in accordance with the present method.

FIGURE 18 shows a loaf produced in accordance with the present method and utilizing the present apparatus. It is to be understood that FIGURE 18 shows the dough after it leaves the twisting portion of the machine and before it passes between the setting belts. As is shown in FIGURE 18, the twisted loaf 283 comprises two elongated pieces of dough 284 and 285. These pieces of dough are tightly twisted around one another. The number of twists of the dough pieces depends upon many different factors, and can readily be regulated by changing the effective length of chain blanket overlying the twisting belt as by shifting bar 290. In addition to being twisted together, each of the component pieces of dough 284 and 285 is twisted about its own longitudinal axis as indicated by lines 286.

Those skilled in the art will readily appreciate that the twisted loaf shown in FIGURE 18 differs from the conventional manually twisted loaf in several respects. In the first place, the loaf is twisted tighter than is the case with a manually twisted loaf. In the second place, in the present loaf not only are the two individual pieces twisted together, but each of the individual pieces is also twisted about its own axis. Also the twisted dough pieces have been elongated during the twisting operation. It has been empirically determined that bread baked from dough twisted as shown in FIGURE 18 has an improved grain structure over loaves baked from dough pieces which have been manually twisted. Also, it has been empirically determined that because the dough piece passes under a flexible continuous blanket which readily conforms to the configuration of the dough pieces, the loaves produced by this method are remarkably uniform despite any variations in the production rate which would substantially affect the number of loaves over the curling chain at any one time.

It is to be understood that the foregoing description and the accompanying drawings have been given only by way of illustration and example, and that changes and alterations in the present disclosure which will be readily apparent to one skilled in the art are contemplated as within the scope of the present invention which is limited only by the claims which follow.

I claim:

1. In a dough-twisting machine the improvement which comprises: an accumulator, said accumulator comprising means defining a dough receiving chute having an open upper end, a lower wall member normally closing the bottom of said chute, said wall member being shiftable to an open position spaced from said chute, a power operator interconnected to said door for shifting said door to said open position, first switch means responsive to a dough piece entering said chute in controlling relationship with said power means, second switch means in series circuit connection with said first switch means, said second switch means being responsive to a dough piece disposed in the lowermost portions of said chute, whereby actuation of said first switch means is effective to cause opening of said lower wall member only when a first dough piece is disposed within said chute closing said second switch means, and a second dough piece enters said chute closing said first switch means.

2. In a dough-twisting machine of the type adapted to receive dough pieces from a feed belt and including an arcuate twisting belt disposed below the end of said feed belt, the improvement which comprises means for depositing two elongated dough pieces in side-by-side relationship upon said twisting belt, said dough depositing means being effective to receive dough pieces from said feed belt, said dough depositing means comprising a chute disposed above said twisting belt adjacent to the end of said feed belt and including a front wall and a transverse wall and a bottom shelf, power means for shifting said shelf to a first position in which the shelf is disposed across the bottom of the chute and is effective to support a dough piece within the chute and to a second position in which the shelf is shifted relative to the front wall of the chute to a position in which clearance is provided for a dough piece to drop from the chute onto the arcuate belt, a control effective to actuate said power means to shift said bottom shelf to said second position when a first dough piece is disposed within such chute and a second dough piece is positioned to enter such chute, said control comprising a switch disposed above the feed belt adjacent to the end thereof and an actuator for said switch disposed adjacent said belt for engagement with dough pieces on said belt, said switch being in circuit controlling relationship with said power means, and means cooperating with said switch effective to actuate said power means to shift said shelf to its second position only after a first dough piece has entered said chute and a second dough piece has engaged said switch actuator and is positioned to enter said chute.

3. The combination with a belt conveyor of means for feeding a pair of dough pieces onto the same in side by side relation comprising a dough piece conveyor, an inclined transfer plate interposed between the discharge end of said dough piece conveyor and said conveyor belt, a barrier mounted for pivotal movement between a position preventing discharge of dough pieces from said plate onto said belt conveyor and a position permitting such discharge and dough piece actuated and barrier actuated means cooperating to control the movements of said barrier.

4. The combination with a belt conveyor of a roll accumulating and feeding mechanism for feeding a pair of dough pieces onto the belt conveyor in side-by side relation comprising a dough piece conveyor, an inclined chute for receiving and supporting rolls of dough in superposed position, said chute being interposed between the discharge end of said dough piece conveyor and said conveyor belt and having an open upper end and an open lower end; a door adjacent the lower end of the chute and movable between a normally closed retaining position and an open discharging position; first triggering means in the chute for moving a switch to an actuating position when a first roll passes down the chute; second triggering means in the chute for actuating the switch when a second roll passes down the chute; means responsive to said switch for moving the door from the closed position to the open position, and door responsive means for returning said door to said open position.

5. The combination with a belt conveyor of a roll accumulating and feeding mechanism for feeding a pair of dough pieces onto the belt conveyor in side-by-side relation comprising a dough piece conveyor, an inclined chute for receiving and supporting rolls of dough in superposed position, said chute being interposed between the discharge end of said dough piece conveyor and said conveyor belt and having an open upper end and an open lower end; a door adjacent the lower end of the chute and movable between a normally closed retaining position and an open discharging position, first triggering means in the chute for moving a first switch to an actuating position when a first roll passes down the chute; second triggering means in the chute for actuating said first switch when a second roll passes down the chute; a second switch adapted to be actuated by the door when it moves to the open position; and power means responsive to the first switch for moving the door from the closed position to the open position and responsive to the second switch for moving the door from the open position to the closed position.

6. The combination with a belt conveyor of a roll accumulating and feeding mechanism for feeding a pair of dough pieces onto the belt conveyor in side-by-side relation comprising a dough piece conveyor, an inclined chute for receiving and supporting rolls of dough in superposed position, said chute being interposed between the discharge end of said dough piece conveyor and said conveyor belt, including an inclined inner wall containing upper and lower apertures; a pivotally mounted first plate positioned in the lower aperture and carrying a switch which is positioned adjacent the upper aperture when a first roll contacts said first plate; a pivotally mounted second plate positioned in the upper aperture and adapted to close said switch when a second roll contacts said second plate; a door adjacent the lower end of the chute and movable between a closed retaining position and an open discharging position; means responsive to said switch for moving the door from the closed position to the open position, and door responsive means for returning said door to said open position.

7. The combination with a belt conveyor of a roll accumulating and feeding mechanism for feeding a pair of dough pieces onto the belt conveyor in side-by-side relation comprising a dough piece conveyor, an inclined chute for receiving and supporting rolls of dough in superposed position, said chute being interposed between the discharge end of said dough piece conveyor and said conveyor belt and having an open upper end, a lower wall member normally closing the bottom of said chute, said wall member being shiftable to an open position spaced from said chute, a power operator interconnected to said wall member for shifting said wall member to said open position, first switch means responsive to a dough piece entering said chute in controlling relationship with said power means, and second means responsive to a dough piece disposed within the lower portion of said chute for conditioning said first switch means for control of said power means, whereby actuation of said first switch means is effective to cause opening of said lower wall member only when a first dough piece is disposed within said chute and a second dough piece enters said chute, and means actuated by said lower wall member for returning said lower wall member to a position closing the bottom of said chute.

8. The combination with a belt conveyor of a roll accumulating and feeding mechanism for feeding a pair of dough pieces onto the belt conveyor in side-by-side relation comprising a dough piece conveyor, an inclined chute for receiving and supporting rolls of dough in superposed position, said chute being interposed between the discharge end of said dough piece conveyor and said conveyor belt and having an open upper end, a lower wall member normally closing the bottom of said chute, said wall member being shiftable to an open position spaced from said chute, a power operator interconnected to said door for shifting said door to said open position, first switch means responsive to a dough piece entering said chute in controlling relationship with said power means, a pivotally mounted flap disposed adjacent to the lowermost portion of said chute and disposed for engagement with a dough piece in contact with said bottom wall for conditioning said first switch means for control of said power means, whereby actuation of said first switch means is effective to cause opening of said lower wall member only when a first dough piece is disposed within said chute in contact with said flap and a second dough piece enters said chute, and means actuated by said lower wall member for returning said lower wall member to a position closing the bottom of said chute.

(References on following page)

References Cited in the file of this patent

UNITED STATES PATENTS

| | | |
|---|---|---|
| Re. 21,425 | Guldbech | Apr. 16, 1940 |
| 1,871,216 | Kirchhoff | Aug. 9, 1932 |
| 1,929,919 | Ekstedt | Oct. 10, 1933 |
| 2,052,840 | Nussbaum | Sept. 1, 1936 |
| 2,216,787 | Steadman et al. | Oct. 8, 1940 |
| 2,590,823 | Rhodes | Mar. 25, 1952 |
| 2,661,880 | Rhodes | Dec. 8, 1953 |
| 2,805,755 | Jones | Sept. 10, 1957 |
| 2,843,983 | Archer | July 22, 1958 |
| 2,867,179 | Eyster | Jan. 6, 1959 |
| 2,893,534 | Sexauer | July 7, 1959 |
| 3,000,154 | Stickelber | Sept. 19, 1961 |